United States Patent Office 3,481,111
Patented Dec. 2, 1969

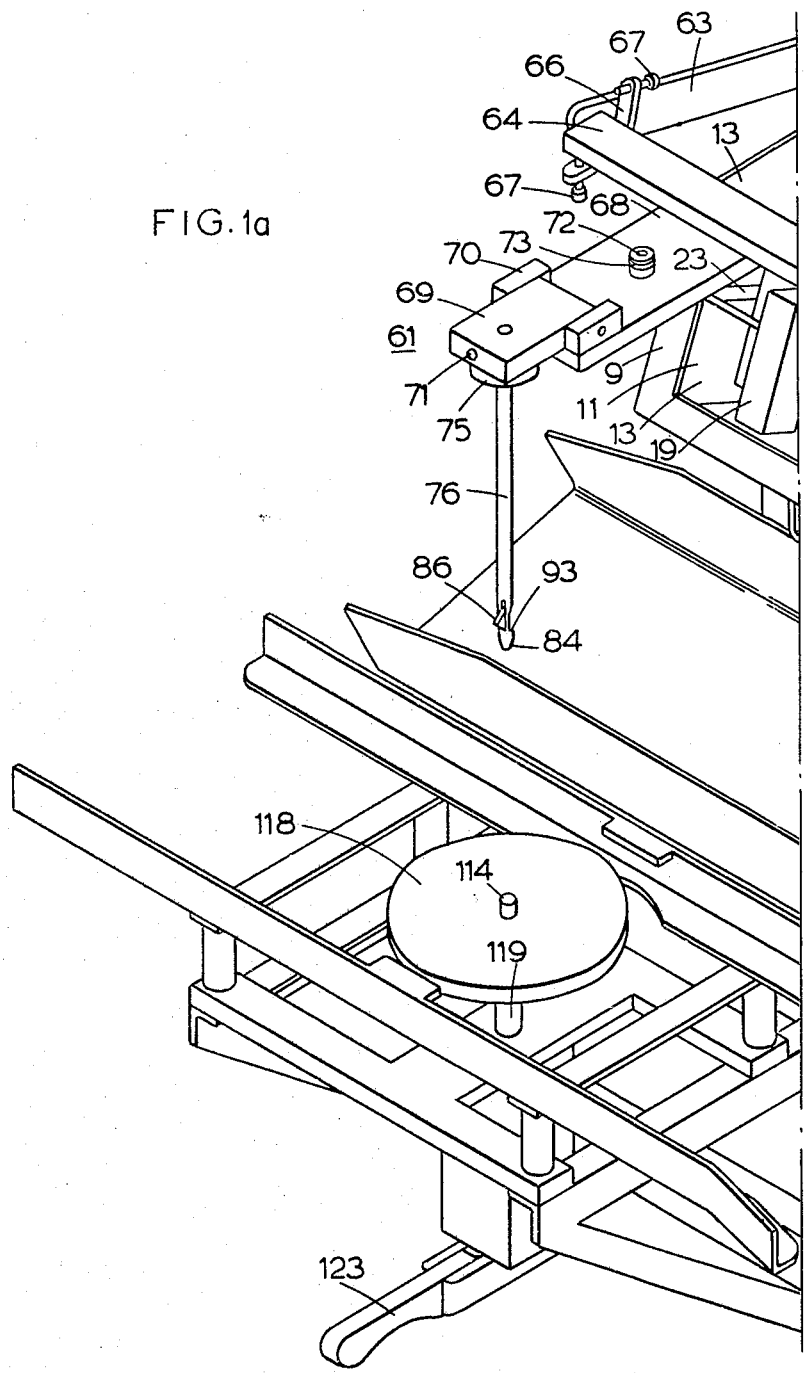

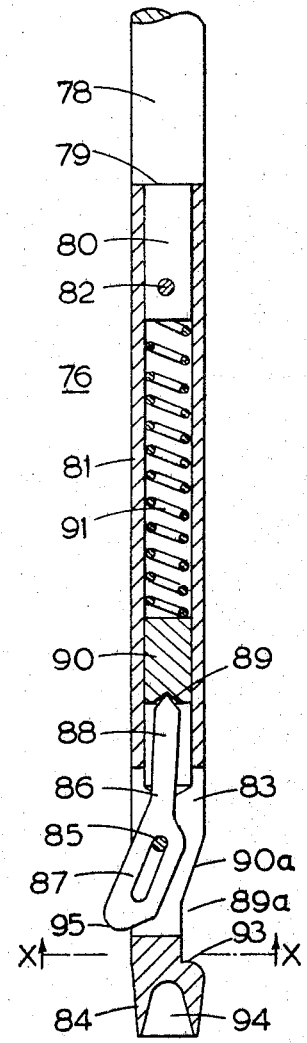
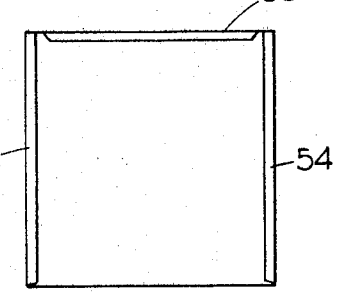
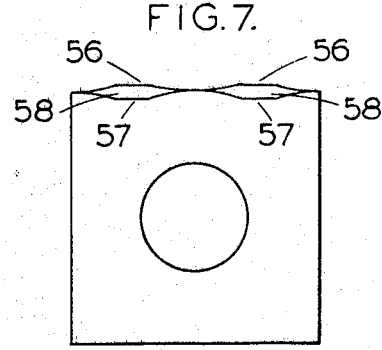
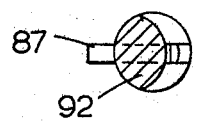

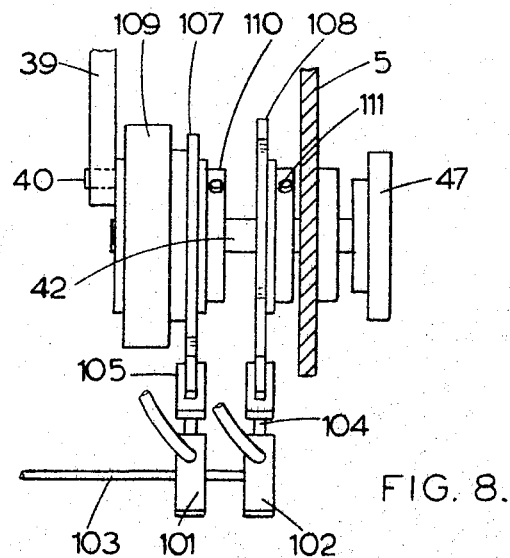
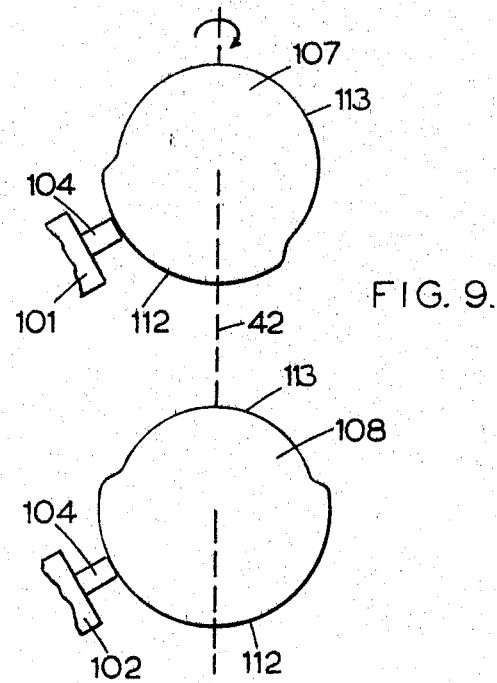

3,481,111
MACHINES FOR INSERTING ARTICLES INTO BAGS OR THE LIKE
Walter Leslie Rand, Gerrards Cross, Henry James Hutton, Kingsbury, London, William Herbert Toull, Hillingdon, and Leslie Eric Zouch, Hayes, England, assignors to Electric & Musical Industries Limited, Hayes, Middlesex, England, a company of Great Britain
Filed Dec. 6, 1965, Ser. No. 511,833
Claims priority, application Great Britain, Dec. 9, 1964, 50,041/64
Int. Cl. B65b 5/04, 35/02, 43/18
U.S. Cl. 53—190                9 Claims

ABSTRACT OF THE DISCLOSURE

A machine for loading flat articles, particularly gramophone records, into bags having means for opening the mouth of a bag from a stack of bags and means for transferring an article from a supply position to a position above the open bag and releasing it into the bag.

---

Figure 1B:
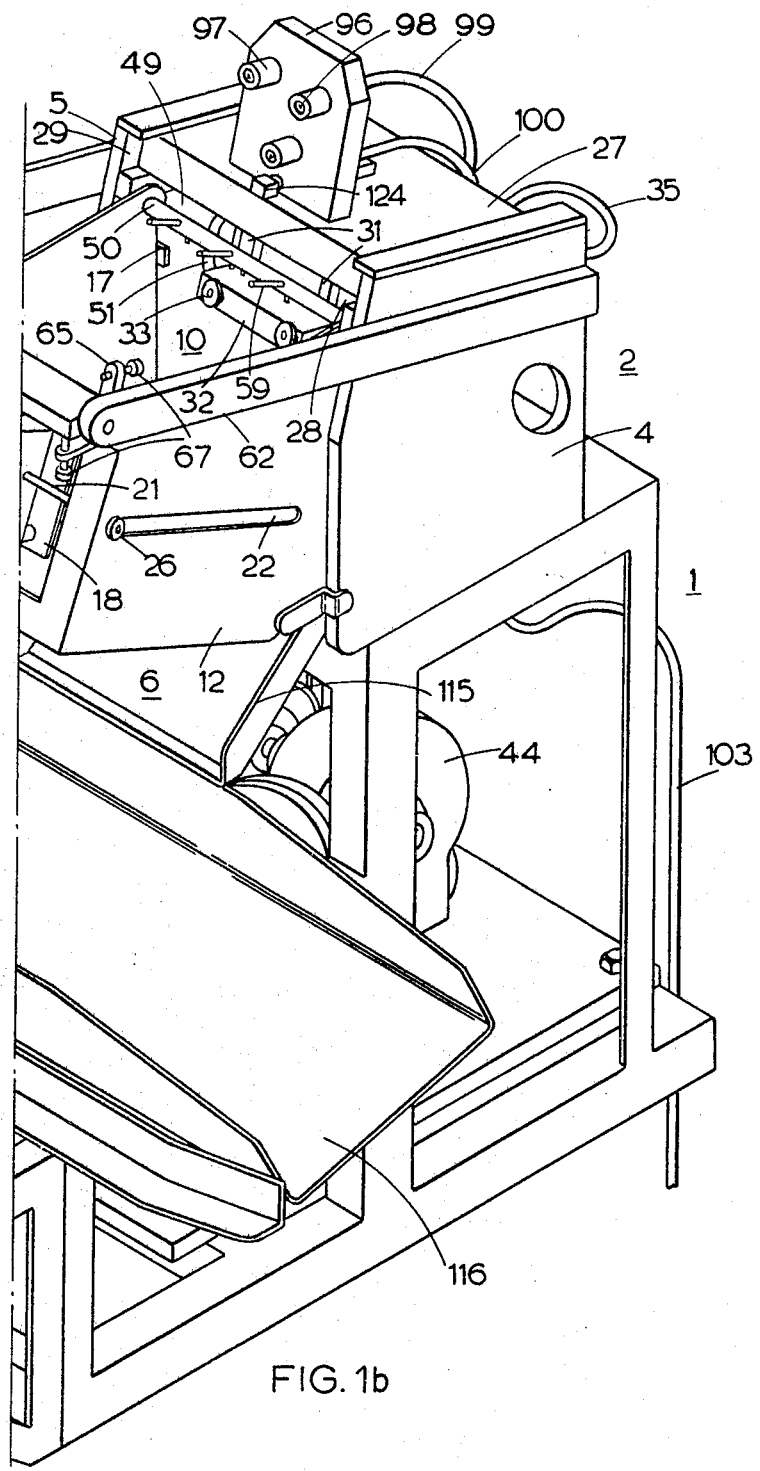

This invention relates to machines for loading articles into bags or the like and it relates more particularly but not exclusively to machines for loading gramophone records into the protective bags or covers in which it is customary to store them and to display them.

In the specification of U.S. patent application No. 229,332 there is described a machine for the production automatically of a series of gramophone records and an object of the present invention is to provide another machine that is adapted automatically to load a series of gramophone records, for example, records manufactured in a machine of the kind described in said patent application No. 229,332 into a pack of record bags provided for them.

It is another object of the invention to provide a machine for loading flat articles, such as gramophone records into bags in such a way that high speed of operation can be achieved with substantially no risk of damage to the records or other articles.

According to the invention there is provided a machine for loading articles into bags including:

(a) first means for supporting a stack of bags,
(b) second means for supporting a stack of articles,
(c) first reciprocating means moveable from a bag-open position to said first supporting means and back again,
(d) said first reciprocating means comprising pulling means for engaging the front portion of the first bag of a stack on said first supporting means and for pulling said front portion when said first reciprocating means is moved back,
(e) retaining means for retaining the rear portion of said first bag as said first reciprocating means is moved back, thereby to open said first bag,
(f) second reciprocating means moveable from a release position substantially above said bag-open position to said second supporting means and back again,
(g) said second reciprocating means comprising transfer means for carrying an article from the stack on said second supporting means when said second reciprocating means moves back and for releasing said articles at the release position,
(h) control means for concommittantly operating said first and second reciprocating means to cause a bag to be opened by said first reciprocating means in time to receive a falling article released by said second reciprocating means.

In the application of the invention to an automatic record press of the kind described in patent application No. 229,332 the machine for loading records into bags may be disposed at the discharge end of the said record press and in a suitable position such that each record as it is discharged from the record press passes through the opening for records to the loading station. Alternatively the machine for loading records into bags may be made independent of the said record press or any other record press and provided with a magazine for records as well as one for the bags and with means for transferring records as well as bags, one at a time to the loading station.

Figure 2:
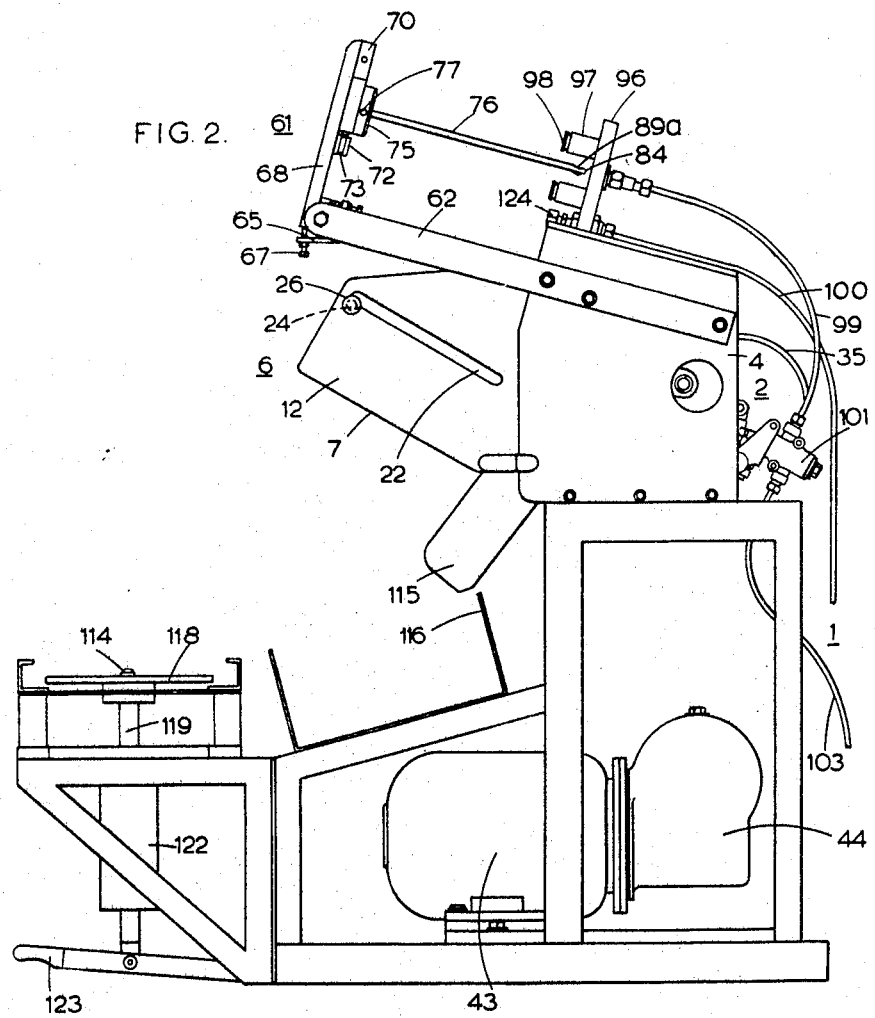
Figure 3:
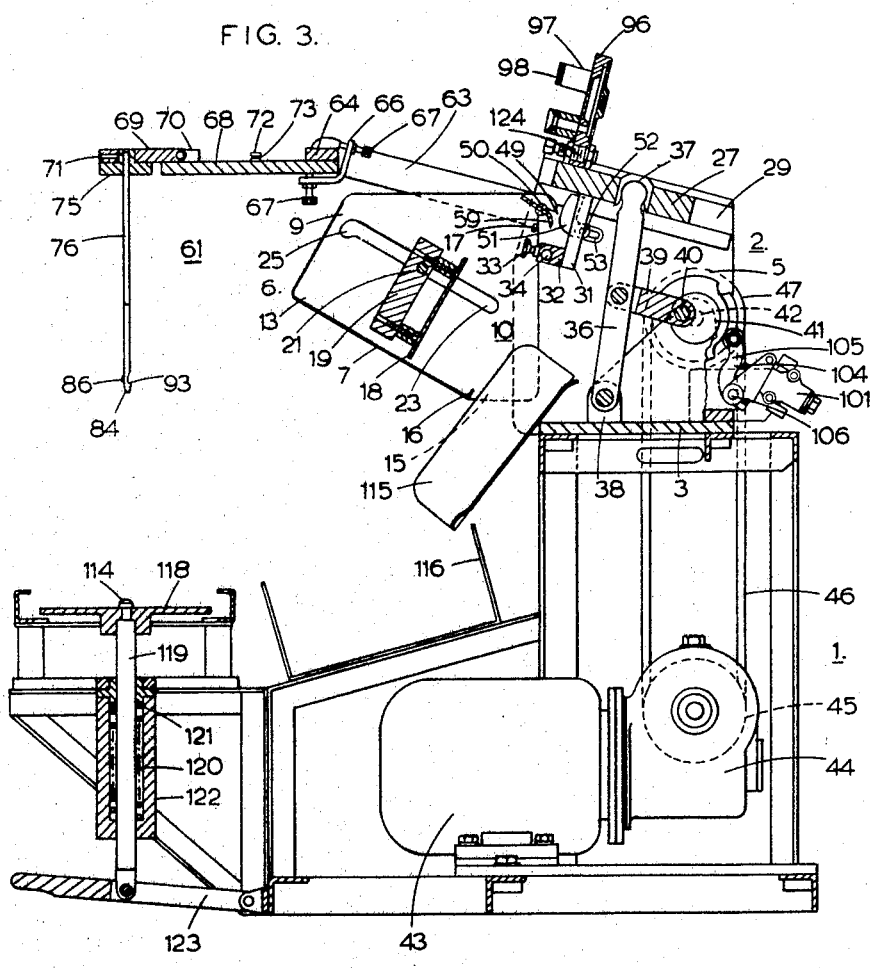

In order that the invention may be clearly understood and readily carried into effect a machine in accordance with the present invention that is provided with both a record magazine and a magazine for bags will now be described by way of example with reference to the accompanying drawings, in which:

FIGURES 1a and 1b are a perspective view seen from the front and to one side of a machine in accordance with the invention, FIGURE 2 is a view in elevation of the machine, seen in FIGURE 1, FIGURE 3 is a view in cross-section and in elevation of the machine seen in FIGURES 1 and 2, FIGURE 4 is a view in cross-section and on an enlarged scale of a portion of the record magazine of the machine seen in FIGURES 1, 2 and 3, FIGURE 5 shows an end view of the magazine post shown in FIGURE 4 in cross-section along the line XX of that figure, FIGURES 6 and 7 show two kinds of record bags that are particularly suitable for loading with records by the embodiment of the invention described with reference to FIGURES 1 to 5, and FIGURES 8 and 9 show on an enlarged scale details of some of the controls used in a machine in accordance with FIGURES 1 to 5.

The machine comprises an angle-iron frame 1 that supports a hollow body portion 2 comprising a base 3 (see FIGURE 3) and side walls 4 and 5. The position of the loading station is at the front of the body portion 2 and its position is indicated in FIGURES 1 and 3 by the reference 10. The magazine 6 for bags is arranged in front of the loading station 10 and comprises a sheet metal member having an inclined base 7, an inclined front wall 9 having an opening 11 therein and side walls 12 and 13. The back ends of the sides 12 and 13 of the bag magazine 6 are secured to the front of the body 2 but the base 7 of the bag magazine stops short of the body 2 to leave a lateral opening 15 (see FIGURE 3) below the loading station 10 and through which a bag loaded with a record can be discharged from the loading station. The back edge of the base 7 is provided with a flange or lip 16 which forms a positioning stop for a pack of bags in the magazine 6 and also prevents bags placed in the magazine from being discharged accidentally through the opening 15. The bags are loaded into the magazine 6 so that they lie in transverse inclined planes substantially parallel to the front wall 9 of the magazine and with their edges opposite their open sides resting on the inclined base 7. They thus tend to gravitate downwardly and rearwardly to a position in which the rearmost bag rests with its bottom edge bearing against the flange 16 and with its top resting against a pair of inwardly directed lugs 17, one of which is visible in FIGURES 1 and 3. The lug 17 visible in FIGURES 1 and 3 projects inwardly from the wall 13 of the bag magazine and a corresponding lug (not seen in the figures) is provided on the wall 12. A plate 18 carrying a weight 19 is slidably mounted in the bag magazine so that it is adapted to bear against the outermost bag in the magazine and to bias a pack of bags in the magazine towards the position in which the rearmost bag bears against the flange 16 and the lugs 17. The weight 19 is mounted on a bar 21 that is disposed transversely in the bag magazine 6 with its ends projecting through the slots 22 and 23 formed in the side walls 12 and 13 respectively of the bag magazine 6. The forward ends 24 and 25 of the slots 22 and 23 are turned down, as seen best in FIGURE 3, to provide a stable position of rest for the plate 18 and the weight 19 while bags are loaded into the magazine 6. Members 26 are mounted on the ends of the bar 21 in order to retain it in the slots 23 and 24 and as the slots are parallel to the inclined base 7 of the magazine 6, the unit comprising the plate 18, the weight 19 and the bar 21 tends to be moved downwardly and rearwardly by gravity, except when in its rest position, so as to maintain contact with and compress a pack of bags placed in the magazine.

Means for transferring bags one at a time from the magazine 6 to the loading station 10 comprises a carriage 27 that is slidably mounted in grooves 28 and 29 formed adjacent the tops of the side walls 4 and 5, respectively, of the hollow body 2. The grooves are inclined at an angle of the order of 15° to the horizontal and slope downwardly from the front. The angle of inclination is not critical. A pair of arms 31 (see FIGURES 1 and 3) depending from the underside of the carriage 27 carry a support 32 for a pair of vacuum cups 33 that communicate with a passage 34 in the support 32. The passage 34 is adapted to be coupled to a flexible tube 35, a portion of which is visible in FIGURES 1 and 2 and forms a part of a vacuum system that will be referred to more fully hereinafter. The carriage 27 is mounted above and to the rear of the bag magazine 6 and it is arranged to undergo a reciprocating movement towards and away from the bag magazine. The two laterally spaced apart vacuum cups 33 are supported at a suitable distance below the carriage 27 such that they are adapted to engage the rearmost bag of a pack of bags in the magazine 6 just below the upper open edge of the bag and to secure it to the carriage by suction. The carriage 27 is shown in its most forward position in FIGURE 3 and in this position the suction cups are supported in the back end of the magazine 6 and forwardly of a plane containing the flange 16 on the base 7 of the magazine and the lugs 17 on the side walls 12 and 13 of the magazine. That is to say, the vacuum cups 33 in their most forward position are forwardly of the position normally occupied by the rearmost bag of a pack of bags in the magazine 6 and, while moving to this position, they will compress a pack of bags in the magazine 6 against the plate 18 while they secure the rearmost bag in the pack to the carriage by suction.

The carriage 27 is adapted to be moved from the forward position shown in FIGURE 3 to a rearward position and during this movement a record bag secured thereto by the cups 33 is dragged over the flange 16 and past the lugs 17 and transferred from the magazine 6 to the loading position 10. Movement is imparted to the carriage 27 by an arm 36 that is pivotally mounted on the carriage by means of the member 37 and also pivotally mounted on the lug 38 mounted on the base 3 of the hollow body 2. The arm 36 is coupled by a link 39 to a pin 40 eccentrically mounted on a disc 41 carried by a driving shaft 42 (see FIGURES 3 and 8). The shaft 42 is coupled to the electric motor 43 via reduction gearing in the housing 44, the pulley 45, the belt 46 and a pulley 47 on the driving shaft 42.

In an alternative embodiment of the invention the pulley 47 is coupled to the driving shaft 42 via a clutch. This provides the advantage that if a handwheel is mounted on the shaft, the shaft can be rotated thereby, the clutch slipping, so that the carriage can be set in a desired position whilst the motor 43 is at rest.

An opening 48 is provided at the top of the body portion 2 for the transfer of records to the loading station 10. This opening is defined by the cross-bar 50, which will be referred to more fully hereinafter, and by the front of the carriage 27 which carriage forms the movable top of the body portion 2. A record which is disposed substantially vertically in a positon above the opening 49 can drop through the opening into the loading station when the carriage 27 has moved rearwardly from its forward position, shown in FIGURE 1, to a backward position in which it supports a bag in the loading station. A pair of guides 51 are provided for guiding a record passing through the opening 49 into the mouth of a record bag supported by the carriage 27 in the loading station. Each guide 51 is supported on the free end of an arm 52 that is fixed to one or other of the side walls 4 and 5 of the body portion 2 so as to be normal thereto. Only one guide 51 is visible in the drawings and, as shown in FIGURE 3, this guide is provided with a slotted tail portion 53 by means of which its position in relation to the opening 49 can be adjusted before fixing it by clamping it on the arm 52. Preferably the fronts of the guides 51 are surfaced with layers of a soft material that will not damage records that come into contact with the guides. The other guide (not visible) is laterally spaced apart from the guide seen in FIGURES 1 and 2 and supported from the side wall 4 of the body portion 2.

Since conventional gramophone record bags normally are flat and will usually be packed into the bag magazine 6 of this machine in that condition, it is desirable to provide a means for ensuring that the mouth of a bag is open while it is supported in the loading station. With this end in view flat record bags of the kinds shown in FIGURES 6 and 7 may be supplied for the machine. In FIGURE 6 there is shown one kind of record envelope formed out of stiff paper. The lowermost wall of the envelope as seen in FIGURE 6 is provided with side flaps 54 which are folded down onto the upper wall and secured thereto to provide an envelope with an opening at the top and the important feature is that the upper wall is made somewhat shorter than the lowermost wall so as to expose a section 55 of the inner surface of the lowermost wall at the mouth of the bag. Another kind of record bag is shown in FIGURE 7. It is made of thinner paper than that of FIGURE 6 and it is formed in any suitable manner to provide a contoured opening at the top. The lowermost wall of the bag, as seen in FIGURE 7, is formed with raised portions 56, while the upper wall is formed with recesses 57 opposite the portions 56. Again, the purpose is to expose a small portion of the inner surface of the lowermost wall of the bag at its mouth. In this case two laterally spaced apart sections 58 are exposed. Bags of the kind shown in FIGURES 6 and 7 should be packed into the magazine 6 with the shorter of the two walls thereof, shown uppermost in the figures, facing the vacuum cups 33 on the carriage 27.

Referring now to FIGURES 1 and 3, the cross-bar 50, defining the forward edge of the opening 49 through which records can move into the loading station 10, is provided with a plurality of prongs 59 disposed in positions such that as a bag is being transferred by the suction cups 33 on the carriage 27 from the magazine 6 to the loading station 10, the wall of the bag facing the rear of the machine will pass under the prongs 59 while the exposed inner surface 55 or 58 of the other wall of the bag will engage the prongs 59 and the lip of that wall of the bag will be held against further rearward movement. However, the top of the rearwardly facing wall of the bag, which is attached to the vacuum cups by suction, will continue to move rearwardly with the carriage to a position rearwardly of the guides 51 and the bag is thereby opened with its mouth directed upwardly and ready to be loaded with a record delivered to the loading station 10 through the opening 49. In an alternative embodiment of the invention the prongs 59 are replaced by a suitably shaped plate.

In this embodiment of the invention the machine is provided with a record magazine for the records that are to be loaded into a pack of bags placed in the bag magazine 6. The record magazine is indicated generally by the reference 61 and comprises a pair of laterally spaced parallel arms 62, 63 secured to the body portion 2 of the machine so that their forward ends extend in front of the body portion 2 and above the bag magazine 6 and at the same inclination to the horizontal as the carriage 27. A flat cross-arm 64 is pivotally mounted between the outer ends of the arms 62 and 63 and a pair of V-shaped members 65 and 66 are rigidly secured to the ends of the arms 62 and 63, respectively. The angle subtended by the arms of these members is approximately 105° and each is disposed with one arm horizontal and directed forwardly and with the other arm directed upwardly and rearwardly so that it is approximately at right angles to the longitudinal direction of the arms 62 and 63. The purpose of the members 65 and 66 is to define the limits of the angular movement that can be imparted to the cross-bar 64, and each arm of the members is provided with an adjustable stop 67 by means of which either limit can be adjusted precisely.

A platform 68 is rigidly secured to the cross-bar 64 so that it projects forwardly thereof as seen in FIGURES 1 and 3, and an auxiliary platform 69 is pivotally mounted between bearing members 70 on the forward end of the platform 68 for angular movement of approximately 180° about a transverse horizontal axis. The auxiliary platform may either be directed forwardly of the platform 68, as seen in FIGURES 1 and 3, or it may be rotated clockwise through 180° relative to the platform 68 so that it is folded down onto platform 68, as shown in FIGURE 2. A sliding pin 71 is held captive in a slot in the forward end of the platform 69 as seen in FIGURES 1 and 3, and the pin is urged by a spring (not shown) to the position shown in FIGURE 3, so that it projects beyond the end of the platform 69 and forms a latching means for holding the platform 69 in the folded down position in which it is shown in FIGURE 2. A stud 72 mounted on the platform 68 is provided with a circumferential groove 73 to receive the end of the pin 71 and the stud 72 and the pin 71 form a latching means for holding the platforms 68 and 69 together in a readily releasable manner in the positions relative to each other in which they are shown in FIGURE 2.

The thickness of a portion of the platform 69 is increased by mounting a disc 75 thereon and the disc and platform are bored through the centre of the disc to receive a record post 76 that is secured in the bore by means of a set screw 77 (see FIGURE 2). A view, partly in cross section, of the record post is shown in FIGURE 4. It comprises a solid stem 78 one end of which is adapted to be secured in the disc 75 and the other end of which is formed with a shoulder 79 and a reduced portion 80. The other end of the record post 76 comprises a hollow stem 81 which fits onto the reduced end 80 of the solid stem 78 and is secured thereto by a cross-pin 82 passing through lateral holes in both stems. The other end of the hollow stem 81 is formed with a lateral slot 83 therethrough and with a tip 84. The lateral opening 83 communicates with the bore in the stem 81 and a cross-pin 85 passes through lateral holes in the wall of the stem bounding the slot 83 and through a slot in a pawl 86 and holds the pawl 86 captive in the slot 83. As shown in FIGURE 4, the pawl 86 comprises a longitudinally slotted body portion 87 and a tail portion 88 that is inclined relative to the body portion. The tail portion 88 is inserted in the bore of the stem 81 so as to be substantially co-axial therewith. Its end is pointed and located in a conical recess 89 in a piston 90 in the bore and a compression spring 91 disposed in the bore between the end 80 of the solid stem 78 and the piston 90 urges the piston and the pawl resiliently into the positions in which they are shown in the figure with the tail portion end of the slot in the pawl bearing against the pin 85 and with the nose of the body portion 87 of the pawl projecting laterally out of the slot 83 in the manner shown.

A section of the stem 81, at a position diametrically opposite the projecting portion of the pawl 86, is formed with a recess 89a therein to provide an inclined portion 90a that is substantially parallel to the edge 95 of the pawl 86, a neck portion 92 of the stem 81 that is of reduced cross-sectional area (see FIGURE 5) and a shoulder 93 that lies approximately the thickness of a record below the pawl 86 when the record post 76 is vertical as shown in FIGURE 4. The tip 84 of the post tapers slightly from the shoulder 93, as shown, and a recess 94 is formed in its end for a purpose that will be referred to hereinafter.

When it is desired to load the record magazine 61 with records the platform 68 is disposed in a horizontal position forwardly of the cross-bar 64 and the auxiliary platform is also disposed horizontally and forwardly of the platform 68 so that the record post points substantially vertically downwardly with the tip 84 forming the lowermost end thereof. The magazine 61 is shown in the loading position in FIGURES 1 and 3. While in this position one or a pile of records may be loaded onto the magazine by placing the record or the pile below the record post and then supporting it in co-axial relationship with the post while raising it up and threading it onto the lowermost end of the post. The tapered tip 84 of the post is of assistance in locating the post in the centre hole of the record or the pile and as the record or the pile continues to be raised it engages the projecting portion of the pawl 86 and raises the pawl up with it, against the action of gravity and the restoring spring 91. The shape of the pawl 86 is such that upward movement imparted thereto causes the cross-pin 85 to retract the pawl into the slot 83 and the record or the pile can move freely along the post 76 in the upward direction. After the record or the last record of a pile has travelled up the post to a position above the pawl 86, gravity assisted by the spring 91 returns the pawl to the position shown in the figures in which it again projects laterally from the post, and the record or the pile can now be lowered so that it again passes over the pawl but downwardly. This time no movement is imparted to the pawl which therefore deflects the record or the lowermost record or records in the pile laterally and further downward movement causes the record or the pile to seat itself on the shoulder 93 of the post.

After the record post 76 has been loaded with records it may be swung upwardly through 180° together with the auxiliary platform 69, so that the platform is moved to its folded down position and is locked in this position in relation to the platform 68 by the pin and stud fastening 71, 72. The platform 68 may now be swung clockwise through 90° to move the record post 76 to the position in which it is shown in FIGURE 2, in which position it is adapted to release records thereon one at a time for transfer to the opening 49 through which the records are transferred to the loading station 10.

The purpose of inclining the record post 76 downwardly towards the rear of the machine as shown in FIGURE 2 is to permit gravity automatically to feed any records on the post towards the discharge end or tip 84 of the post to positions in which the next record to be released is in contact with the shoulder 93 on the post. It will be observed that the recess 89a at the discharge end of the post is uppermost while the post is in the position it is shown in FIGURE 3 and the projecting portion of the pawl is directed downwardly. This arrangement ensures that while a record on the post 76 can slide down it as far as the tip 84 it cannot inadvertently slide over the tip 84 and off the post.

The carriage 27, which transfers bags in the bag magazine 6 one at a time to the loading station 10, is also used to transfer records one at a time from the record post 76 to a position above the opening 49 leading to the loading station 10 and suction means are used to attach a record to the carriage while the transfer is being made.

A supporting plate 96 is mounted on the top surface of the carriage 27 so as to be normal thereto and this plate carries three forwardly directed members 97 each of which carries a suction cup 98 at its front end. The members 97 have passages therein which are connected in parallel and in series with a flexible tube 99 forming a part of the vacuum system referred to hereinbefore. The arrangement of the suction cups 98 is preferably such that they lie in a circle having a diameter somewhat less than the diameter of the label of the smallest record to be loaded by the machine and the centre of the circle is co-axial or substantially co-axial with the record post 76 in the position in which the post is shown in FIGURE 2. The position of the record post 76 in relation to the suction cups 98 can be adjusted to some extent by adjusting the stops 67 on the appropriate arms of the V-shaped members 65 and 66 thereby to regulate the limiting position in a clockwise direction of the platform 68.

The member 96 also supports a tube 124 terminating in a downwardly directed nozzle and connected to another flexible tube 100 that is adapted to be connected to a pressurised air system. For example, it may be connected to the air discharge side of the vacuum system incorporating the vacuum cups 33 and 98 and the vacuum tubes 35 and 99. The purpose of the downwardly directed nozzle is to direct a stream of air into the mouth of a bag in the loading station 10 as an additional safeguard in ensuring that a bag is open while held in that position.

Since both the record bags and the records are attached to the carriage 27 by suction while they are being transferred to the loading station 10 and to a position above the opening 49, respectively, control means are necessary to control the creation of a sub-atmospheric pressure in the vacuum cups 33 and 98 at those moments when the cups are required to attach a bag and a record to the carriage and to increase the pressure in the appropriate cups to normal again at those instants when the suction cups 98 are required to release a record and the suction cups 33 are required to release a bag loaded with a record. With the end in view the vacuum tubes 99 and 35 are connected to a vacuum pump (not shown) via a pair of valves 101 and 102 (see FIGURES 2, 3, 8 and 9) that are connected in parallel and in series with a tube 103 leading to the vacuum pump. The axially moving stem 104 of each valve is spring biased outwardly and in the outward position of the stem a valve puts the vacuum line 99 or 35 associated with it in communication with the atmosphere. The valves are moved to their inward positions, in which the vacuum lines 99 and 35 are connected to the vacuum system, through the agency of a pair of pivoted levers 105 (seen best in FIGURE 3) mounted on a lever shaft 106 and actuated by cams. Since the valves 101 and 102 have to be operated in timed relationship with the carriage 27 it is convenient to mount the cams 107 and 108, which operate them, on the driving shaft 42 for the carriage. A third vacuum valve, not shown, in suction line 103 is fitted to override the valves 101 and 102 enabling predetermined batches of records to be obtained, said third valve working in conjunction with a counter.

Referring more particularly to FIGURES 8 and 9, the cams 107 and 108 are mounted on the shaft 42 between the wall 5 of the hollow body 2 and a bearing supporting member 109. Each cam is formed with a hub 110 and is rotatable on the shaft to find its correct angular position before it is locked on the shaft by means of a set screw 111 carried by the hub 110. The shapes of the cams are shown in FIGURE 9 together with their relative positions on the shaft 42 and in relation to each other when the carriage 27 is in its most forward position and picking up a record from the record post 76 and a record bag from the bag magazine 6. Each cam has a large radius peripheral surface 112 and a smaller radius peripheral surface 113 and while a surface 112 is in engagement with a valve stem 104 that valve places the vacuum line and the vacuum cups associated with it in communication with the vacuum pump or chamber.

It will be observed from FIGURE 9 that all the vacuum cups are in communication with the vacuum pump in the most forward position of the carriage 27 to enable it to pick up a record and a bag while in this position, and as the carriage is moved backwardly away from its most forward position the shaft 42 rotates clockwise (seen in FIGURE 9) and the carriage carries a record from the record post 76 to a position vertically above the opening 49 leading to the loading station. The cam 107 controls the vacuum cups that carry the records, and at the instant when the carriage is supporting a record on the carriage over the opening 49, the trailing edge of the large radius section 112 of the cam 107 passes the stem 104 of the valve 101 and allows the stem to move outwardly to release the partial vacuum in the cups 98. Hence the record on the carriage is released and descends by gravity into the loading station 10. While this action has been taking place, the vacuum cups 33 have also extracted a record bag from the magazine 6 and transferred it to the loading station in time to receive in it the record released by the carriage and guided into the mouth of the bag by the guides 51 while the mouth is being held open by the prongs 59 and the vacuum cups 33 in the manner described hereinbefore. Shortly after the record has been loaded into the bag in this manner, the trailing end of the large radius section 112 of the circumference of the cam 108, which controls the vacuum cups 33, passes the stem 104 of the valve 102 and allows the stem to rise and break the partial vacuum in the cups 33 and the bag loaded with the record is release and descends by gravity through the opening 15.

A chute 115 is provided below the opening 15 to direct bags loaded with records discharged from the machine into a transversely disposed channel 116. Boxes of a suitable size to receive the discharged records may be fed along the channel and disposed in turn under the discharge end of the chute 115. If desired, a conveyor belt or the like may be arranged in the channel 116 and means may be provided for moving the belt forward step by step to move a plurality of boxes in sequence into the loading position below the chute 115 and the belt may be arranged to be controlled automatically by a suitable counting device or the like provided to detect when a box is full of records.

Records manufactured by an automatic record press of the kind described in the specification of patent application No. 229,332 are usually discharged from the press onto portable record stands each comprising a circular base member having a co-axial record post projecting upwardly therefrom. The records form into a pile on a record stand placed in the press to receive them and as each stand is filled it is removed and stored and replaced by an empty stand. Such stands are very suitable for transferring records to the record magazine of the bag loading machine described hereinbefore and with this object in view a circular platform 118 is supported by the frame 1 of the machine directly below the record post 76 in the loading position of the post in which it is shown in FIGURES 1 and 3. The platform 118 is carried on the upper end of a vertical rod 119 disposed in co-axial relationship with the post 76 in the said loading position and biased towards the post by a compression spring 120 which bears against a collar 121 secured to the rod 119 and against the base of a housing 122 surrounding a portion of the rod. The spring 120 urges the rod 119 and platform 118 to an uppermost position in which the surface of the platform 118 is separated from the tip 84 of the post 76 by a distance slightly less than the height of the record posts found on the record stands mentioned hereinbefore but the rod 119 projects downwardly through the base of the housing 122 and it is attached to a hand or foot actuated lever 123 by means of which it can be lowered against the action of the spring 120 to a position in which the distance between it and the record post 76 is slightly greater than the height of the said record posts on the record stands. In an alternative embodiment of the invention a form of the bagging machine is mounted on the automatic record press enabling records to be delivered ready bagged.

When the record magazine 61 of the machine is to be loaded with a pile of records on one of the aforementioned record stands, the loaded stand is brought over to the machine and placed on the platform 118 while the platform is held depressed by a downward pressure applied to the lever 123. The stand is centred on the platform with the help of a centre projection 114 and a complementary recess in the base of the stand so that the post of the stand is co-axial with the post 76 of the machine. The lever 123 is then released slowly so that the platform 118 rises with the stand thereon and the top of the post on the stand engages in the recess 94, referred to hereinbefore (see FIGURE 4), in the tip 84 of the post 76. The records can now be transferred to the post 76 by raising the pile until the lowermost record thereon has moved to a position on the post 16 higher than the pawl 86. During the upward movement of the pile the top of the pile will have engaged the pawl 86 and caused it to be retracted within the post 76 but as soon as the bottom of the pile is clear of the pawl, the latter will descend by gravity to its exposed position shown in the figures. The pile of records can now be lowered gently until the bottom record, deflected by the pawl 86, seats on the shoulder 93 of the post 76.

The flexible tube 103 of the vacuum system of the machine may be connected to a suitable remotely situated vacuum pump or vacuum chamber, but if desired a pump and/or a vacuum chamber may be mounted on the framework 1 and either a separate motor or the electric motor 43 for driving the carriage 27 may be employed to drive the vacuum pump.

When the machine is to be operated the weighted plate 18 in the bag magazine 6 may be moved to its position of rest with the bar 21 thereof in the upper ends 25 of the slots 23 while a pack of bags is placed in the magazine. If the carriage 27 is in its most forward position as shown in the figures, the rearmost end of the pack of bags will rest against the flange 16 and the vacuum cups 33 on the carriage and the weighted plate may now be moved from its position of rest and allowed to bear against the forward end of the pack to compress it slightly and hold the pack against the flange 16 and the vacuum cups 33.

The record magazine 61 will also be loaded with a pile of records to be inserted in the bags and then the post 76 will be moved to the position in which it is shown in FIGURE 2, so that it points in the direction of movement of the carriage 27 and the records thereon are moved along the post by gravity until the record at the inward end of the pile engages the vacuum cups 98 on the carriage 27. This occurs forwardly of the pawl 86 when the carriage is in its most forward position, as shown in FIGURE 2. The vacuum pump or chamber may now be switched on and as the valves 101 and 102 of the vacuum system are in position in which both sets of suction cups 98 and 33 are in communication with the pump or chamber they secure a record and a bag respectively, to the carriage 27 by suction. If the driving motor 43 has not already been switched on with the switching on of the vacuum pump or chamber it will now be switched on to cause the carriage to move towards the back of the machine. There is sufficient resilience in the vacuum cups 98 to permit the record attached to them to follow the contour of the post and move over the pawl 86 and the shoulder 93 and off the end of the post as the carriage moves away, but the next record on the post will follow the record being transferred by the carriage, due to gravity, only until it comes up against the shoulder 93 on the post and further movement of the next record and the remainder of the pile is arrested. During this action of the carriage the vacuum cups 33 will also have secured a bag from the magazine 6 to the carriage by suction and as the carriage moves away from the magazine 6 it drags the bottom edge of the bag over the flange 16 at the base of the magazine and the bag then becomes suspended by the vacuum cups over the discharge opening 15. The remainder of the pack of bags will follow the said bag only until the next bag to be transferred moves into engagement with the flange 16 and the lugs 17. As the carriage 27 continues its movement towards the back of the machine it transfers the record on it towards a position over the opening 49 to the loading station and it moves the bag on it towards the prongs 59 associated with the loading chamber 10. These prongs arrest the upper edge of the forwardly facing wall of the bag but the suction cups 33 continue to move the wall of the bag attached thereto so that the bag is held open in the loading chamber with the mouth of the bag uppermost and below the opening 49 and the record guides 51. As mentioned hereinbefore, the opening of a bag may be assisted by arranging for the nozzle of the tube 124 to direct a stream of air into the bag at this point. At the appropriate instant in the backward travel of the carriage 27 the cam 107 operates the valve 101 to break the partial vacuum in the vacuum cups 98 and release the record, which descends by gravity through the opening 49 and is guided by the guides 51 into the mouth of the bag in the loading station. An instant later the cam 108 operates the valve 102 to break the partial vacuum in the vacuum cups 33 and the loaded bag is then released and descends by gravity through the discharge opening 15 and down the chute 115 into the trough 116. An instant after the release of the loaded bag the carriage reaches the end of its backward movement and starts to move forward again. Towards the end of this forward movement the cams 107 and 108 operate the valves 101 and 102, respectively, to create a partial vacuum against in the vacuum cups 98 and 33 and as the carriage moves further forward the cups engage another record in the magazine 61 and another bag in the magazine 6 and attach them to the carriage for transfer to the loading station on the next rearward movement of the carriage.

Generally speaking, the machine will be required to deal only with one size of record but, if desired, parts of the machine may be adjustably mounted, e.g. the vacuum cups 33 and 98, the prongs 59 and the lugs 17, in such a manner that the machine can be adapted to load records of different sizes into bags of appropriate sizes. Moreover although the invention has been described with particular reference to a machine for inserting gramophone records into bags a machine in accordance with the invention may also be useful for loading suitable articles other than gramophone records into bags or the like.

What we claim:

1. A machine for loading articles into bags including:
   (a) first means for supporting a stack of bags,
   (b) second means for supporting a stack of articles,
   (c) first reciprocating means moveable from a bag-open position to said first supporting means and back again,
   (d) said first reciprocating means comprising pulling means for engaging the front portion of the first bag of a stack on said first supporting means and for pulling said front portion when said first reciprocating means is moved back,
   (e) retaining means for retaining the rear portion of said first bag as said first reciprocating means is moved back, thereby to open said first bag,
   (f) second reciprocating means moveable from a release position substantially above said bag-open position to said second supporting means and back again,
   (g) said second reciprocating means comprising transfer means for carrying an article from the stack on said second supporting means when said second reciprocating means moves back and for releasing said article at the release position, (h) control means for concommittantly operating said first and second reciprocating means in time to receive a falling article released by said second reciprocating means.

2. A machine according to claim 1 wherein:
(i) said second supporting means is located above said first supporting means, and
(j) said first and second reciprocating means are carried by a common reciprocating carriage.

3. A machine according to claim 1 wherein:
(k) said pulling means and said transfer means are each suction operated devices, and
(l) said control means is arranged to release the suction of said transfer means and the suction of said pulling means in succession so that each bag after receiving an article is released to a delivery station.

4. A machine according to claim 1 in which said articles are gramophone records, and wherein
(m) said second supporting means comprises a spindle having a free end and which is adapted to pass through the centre holes of said records,
(n) latching means is provided near the free end of said spindle normally to retain records on said spindle, and
(o) said transfer means is able to release a record from said latching means so that it can be carried to said release position.

5. A machine according to claim 4 wherein:
(p) said post is displaceably mounted so that it can be displaced from a position turned towards said second reciprocating means to a position turned away therefrom to allow records to be pushed on to said spindle.

6. A machine according to claim 5 wherein:
(q) said post can be displaced to point downward, and
(r) a platform for gramophone records is located beneath the downward pointing position of said post, said platform being liftable to push records on to said post.

7. A machine for loading flat articles into bags comprising:
(a) a magazine for holding a stack of bags with the mouths uppermost,
(b) intermittently actuated suction means for opening the mouth of the foremost bag in said magazine,
(c) a positioning device for positioning an article to be loaded into a bag so that the article is positioned substantially up-right above the mouth of a bag which has been opened by said opening means, and
(d) control means for operating said opening means and said positioning device in timed relationship to release an article from said positioning device when the mouth of the foremost bag has been opened by said opening means so that the article falls into the bag.

8. A machine for loading flat articles into bags comprising:
(a) a first magazine for holding a stack of bags with the mouths uppermost,
(b) means for opening the mouth of the foremost bag in said first magazine,
(c) a second magazine for holding a stack of flat articles,
(d) a positioning device for transferring an article from said second magazine and positioning it substantially up-right above the mouth of a bag opened by said opening means, and
(e) control means for operating said opening means and said positioning device in timed relationship so that for each operation of the said opening means and article is positioned by said positioning device and is subsequently released in time to fall into the respective bag opened by said opening means.

9. A machine according to claim 8 in which said control means includes means for releasing the bag after the article has been released by said positioning device, so that the bag containing the article is released to a delivery station.

References Cited
UNITED STATES PATENTS

| | | | |
|---|---|---|---|
| 2,843,988 | 7/1958 | Thompson et al. | 53—386 |
| 3,075,324 | 1/1963 | Burks et al. | 53—29 |
| 3,330,090 | 7/1967 | Court et al. | 53—180 X |
| 3,330,093 | 7/1967 | Schorer | 53—189 |
| 2,907,160 | 10/1959 | Friedman et al. | 53—189 |

THERON E. CONDON, Primary Examiner

E. F. DESMOND, Assistant Examiner

U.S. Cl. X.R.

53—385, 386